Nov. 29, 1938.  F. T. IRGENS  2,138,239
SELF-PROPELLED IMPLEMENT
Filed Feb. 1, 1936  3 Sheets-Sheet 1
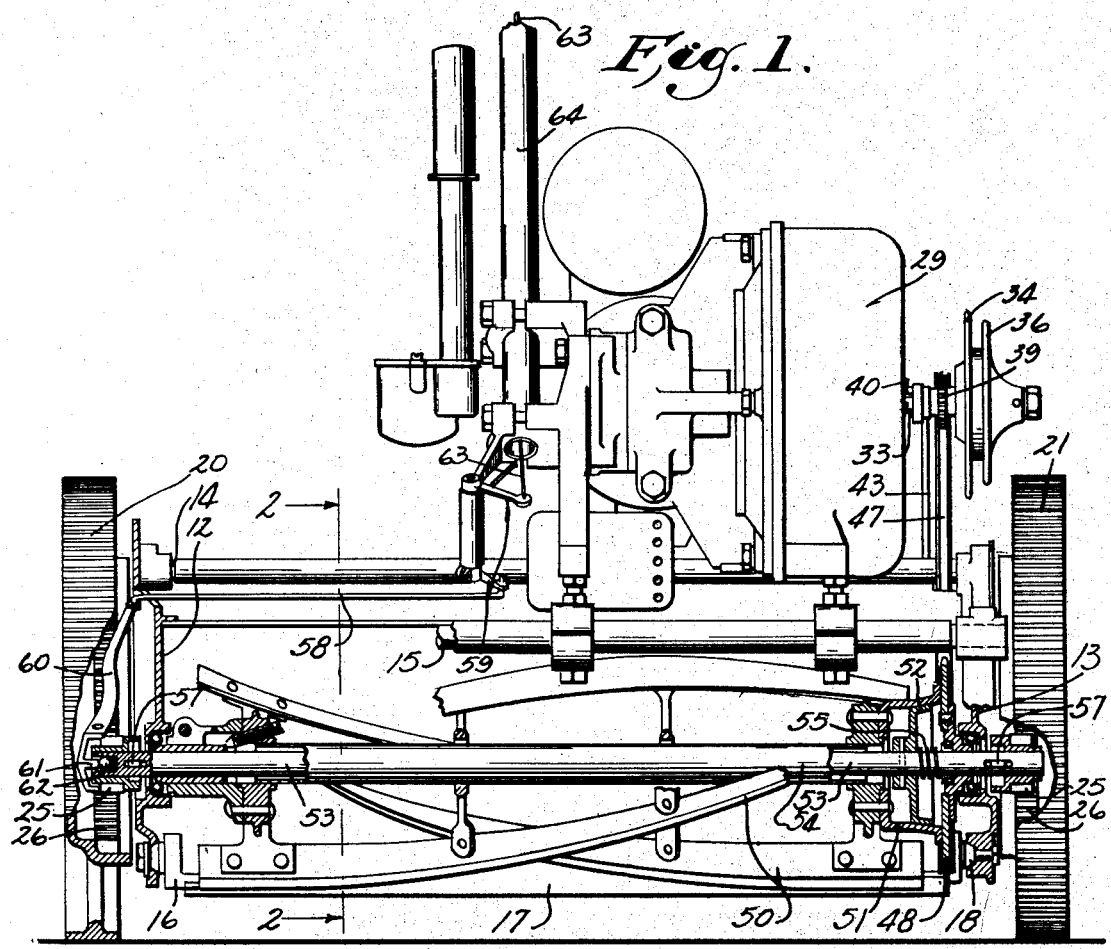
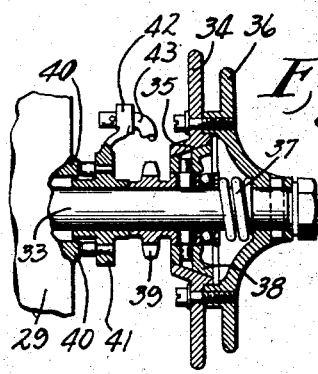
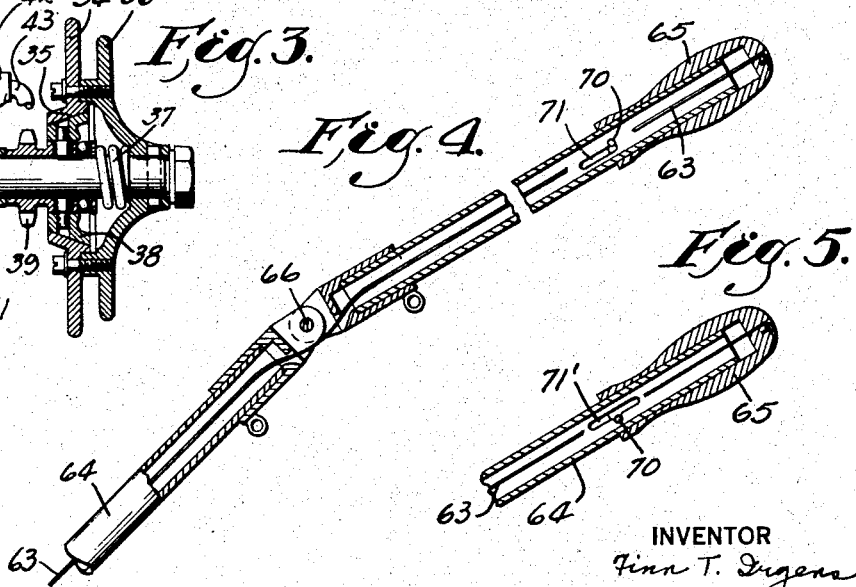
INVENTOR
Finn T. Irgens
BY Wheeler, Wheeler and Wheeler
ATTORNEYS Nov. 29, 1938.   F. T. IRGENS   2,138,239
SELF-PROPELLED IMPLEMENT
Filed Feb. 1, 1936   3 Sheets-Sheet 2
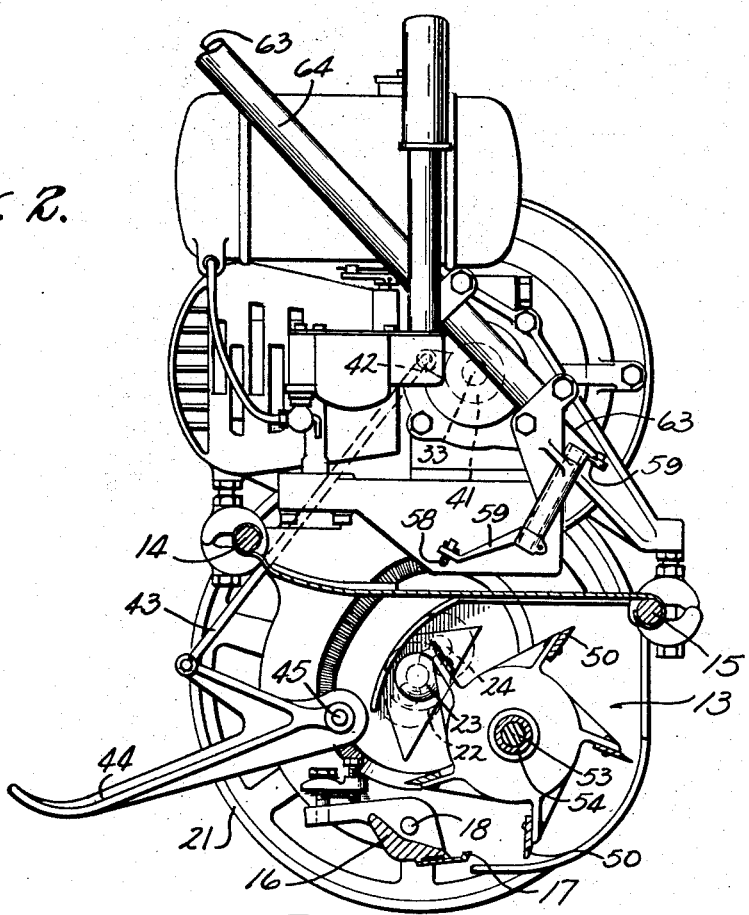
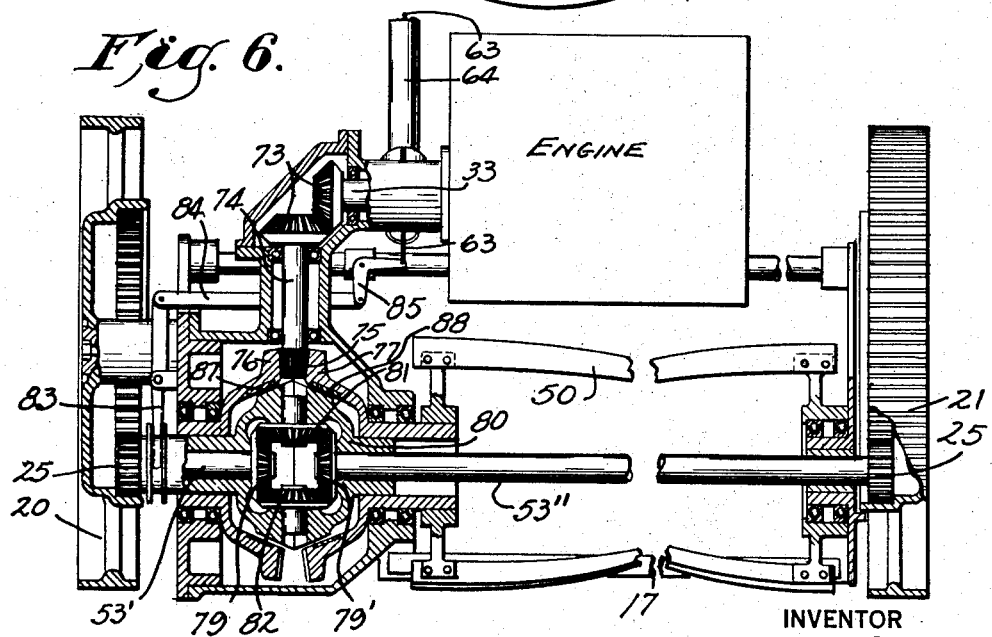
INVENTOR
Finn T. Irgens
BY
Wheeler, Wheeler and Wheeler
ATTORNEYS Nov. 29, 1938.  F. T. IRGENS  2,138,239
SELF-PROPELLED IMPLEMENT
Filed Feb. 1, 1936  3 Sheets-Sheet 3
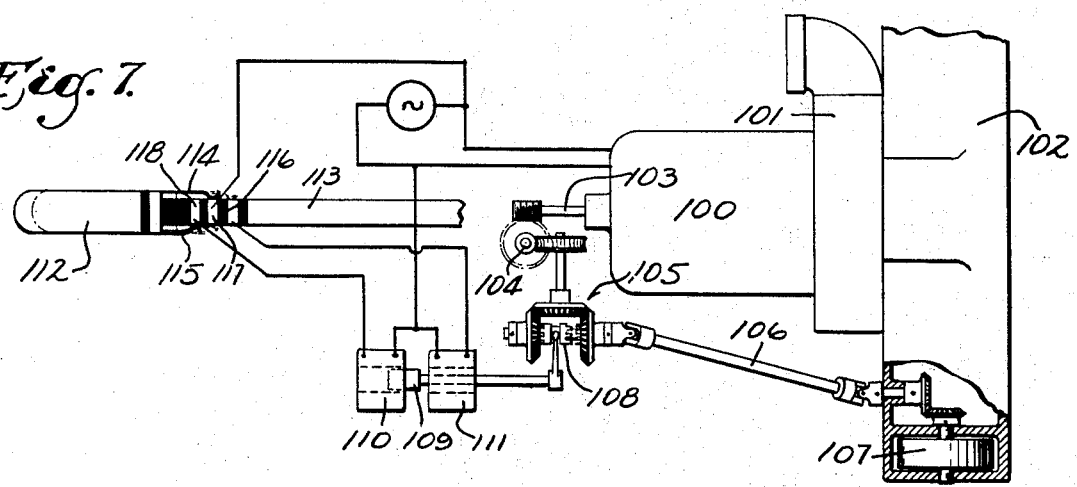
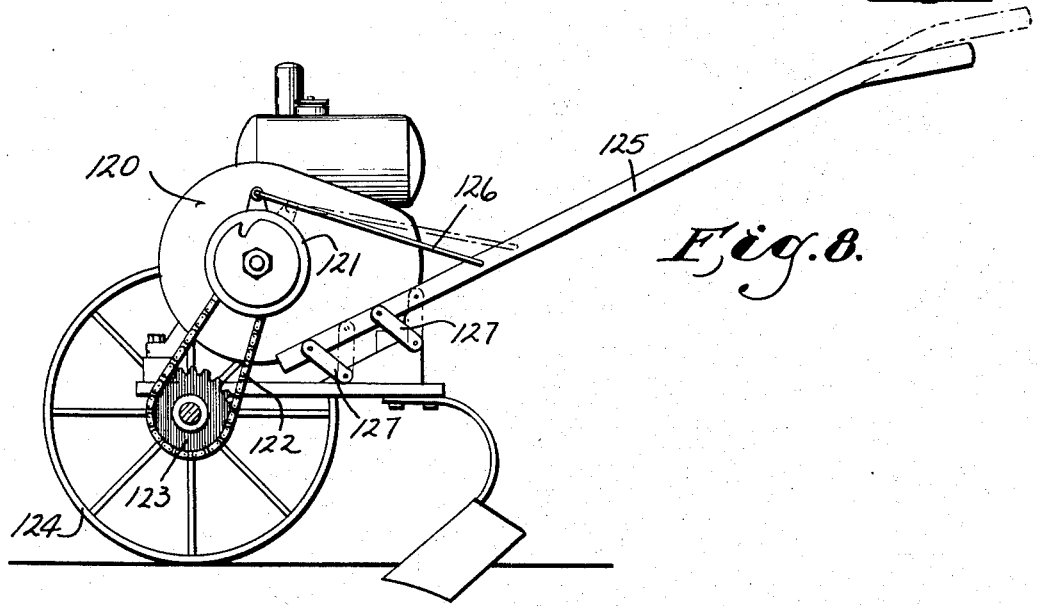
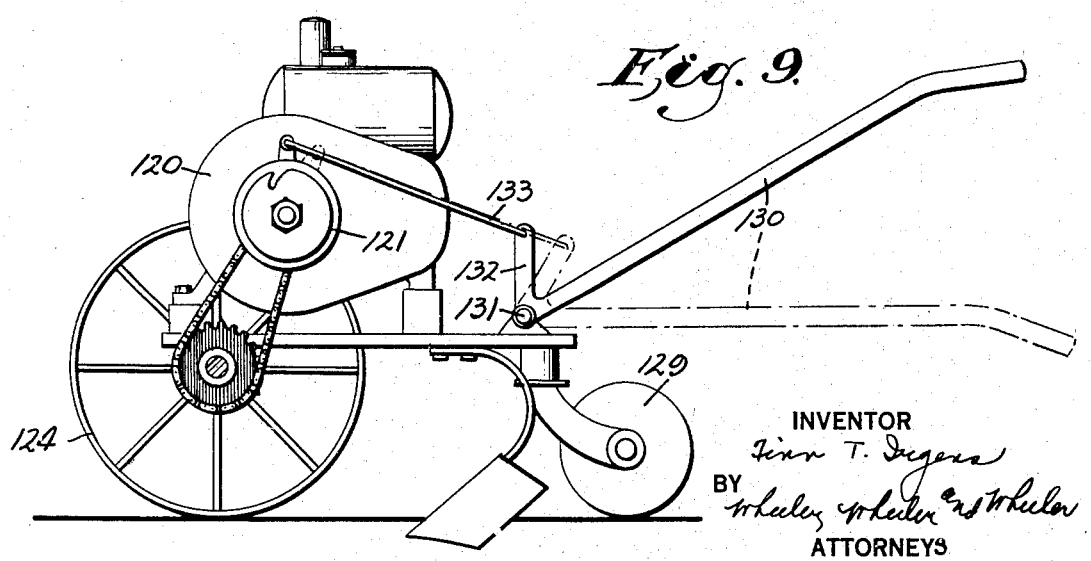
INVENTOR
Finn T. Irgens
BY
ATTORNEYS Patented Nov. 29, 1938

2,138,239

UNITED STATES PATENT OFFICE 2,138,239

SELF-PROPELLED IMPLEMENT

Finn T. Irgens, Wauwatosa, Wis., assignor, by mesne assignments, to Outboard, Marine & Manufacturing Company, Wilmington, Del., a corporation of Delaware Application February 1, 1936, Serial No. 61,918

24 Claims. (Cl. 180—19)

This invention relates to improvements in self-propelled implements. The present application is a continuation in part of my application of like name, Serial Number 716,815, filed March 22, 1934, now Patent #2,055,724, dated Sept. 29, 1936.

It is the primary object of the present invention to cause any self-propelled implement to respond automatically to the movement of the operator. The implement, regardless of its character, has a handle similar to that of a vacuum sweeper, a plow, or a lawn mower, and this handle is either movable bodily or has a grip portion movable with respect to the remainder of the apparatus. The movable element is so connected with a clutch or clutches or other controls that any movement thereof with respect to the implement will operate that clutch or control which tends to restore the original relation of the parts. Thus, if the operator advances, the implement will automatically advance; and if the operator stops, the implement will stop. If the operator moves to the rear, the implement may likewise be made to move to the rear, this feature being optional.

In the drawings:

Figure 1 is a front elevation of the device with portions of the mechanism broken away to an axial section to disclose details of the construction.

Figure 2 is a view taken in section on the plane indicated at 2—2 of Fig. 1.

Figure 3 is a fragmentary detail view of the clutch in section.

Figure 4 is a detail view of the handle and grip in section.

Figure 5 is a detail view in section of a modified form of handle and grip.

Figure 6 is a view similar to Figure 1 illustrating a modified embodiment of the invention in which reverse as well as forward operation is possible.

Figure 7 is a diagrammatic view illustrating one possible application of the invention to vacuum cleaner practice, portions of a vacuum sweeper being illustrated in plan.

Figure 8 is a view in side elevation showing a cultivator embodying the invention.

Figure 9 is a view in side elevation showing a different type of cultivator embodying the invention.

Like parts are designated by the same reference characters throughout the several views.

In several of the different devices herein disclosed, I have illustrated different applications of the underlying idea, it being my purpose merely to exemplify some of the various possibilities. It is to be understood that for the most part any of the various suggested handle arrangements may be used interchangeably on any self-propelled implement.

Referring to Figures 1, 2, 3, and 4, I shall first describe the lawn mower therein shown.

The frame of the machine comprises the usual heads 12 and 13 connected by frame bars 14 and 15 and by the carrier 16 for the shear blade 17, said carrier being fulcrumed at 18 to the respective heads and adjusted by the conventional set screw arrangement.

The wheels 20 and 21 for the support of the frame are adjustably connected to the respective heads 12 and 13 by means of axle skeins 22 adjustably fixed by bolts 23 in slots 24 which are arcuately concentric with the point of mesh of driving pinions 25 through the internal gears 26 of the wheels. The driving pinions and their connections will be described hereinafter.

Mounted on the frame bars 14 and 15 is an engine which may be of conventional two cycle design. The engine, being conventional, is not described in detail.

Upon the projecting end of the engine crank shaft 33 is a combined rope starter disk and clutch shown in Figs. 1 and 3. The starting pulley is made up of a disk 34 comprising a conical clutch face 35 connected by bolts to the notched disk 36 which is fastened to the end of the drive shaft 33. The notched disk 36 houses a clutch spring 37 engaged to a suitable thrust bearing with the driving clutch member 38 which is fastened by radial pins to the hub of a sprocket pulley 39.

The end face of the engine housing 29 is provided at 40 with cam teeth peripherally disposed about shaft 33 as shown at Figs. 1 and 3. A collar 41 bearing freely upon shaft 33 has axially projecting pins as shown in Fig. 3 which comprise cam followers engageable with the teeth 40 to move the collar axially and thereby to disengage the clutch when the collar is rotated by means of arm 42 and link 43. This link is connected with the foot 44 pivoted at 45 to the frame and projecting rearwardly to engage the ground whenever the operator releases the control handle hereinafter to be described. As the machine tends to oscillate, when so released, its weight will cause the foot 44 to pivot about the fulcrum 45, thereby disengaging the clutch and allowing the engine to continue in operation without operating any part of the apparatus.

The driven sprocket 39 of the clutch mechanism just described is connected by a chain 47 with a sprocket 48 directly connected with the reel 50 so that the reel will continue in operation at all times when the clutch on the engine shaft is engaged. The hub portion 51 of sprocket 48 comprises the outer member of another clutch by which the operation of the driving wheels 20 and 21 is controlled separately from the operation of the reel 50. The inner clutch member 52 is mounted upon a shaft 53 which extends axially through the tubular reel shaft 54. Shaft 53 is axially movable for the engagement and disengagement of clutch member 52 from clutch member 51, the engagement being effected under the bias of a clutch spring at 55.

At its ends shaft 53 carries the pinions 25, in the hubs of which are located the type of overrunning clutch so common in lawn mowers, the interior of the hub being toothed and the shaft having a dog 57 designed to engage the teeth in one direction of relative rotation and to reciprocate to pass the teeth in the other direction of relative rotation of the shaft and pinion. In the ordinary hand operated lawn mower the wheels 20 and 21 drive the reel through such a clutch. In this device the functioning of the clutch is reversed and the reel serves to drive the wheels when the propelling clutch comprising parts 51 and 52 is engaged.

The axial manipulation of shaft 53 to control the functioning of the propelling clutch is subject to the regulation of a lever 60 housed within the supporting wheel 20 and having a terminal finger 61 engageable with a thrust ball 62 socketed in the end of the shaft 53, as shown in Fig. 1. This lever is connected through an aperture in the head 12 by means of link 58 to a bell crank 59 which in turn is connected to a Bowden wire 63 extending lengthwise through the tubular handle lever 64 which, in this particular embodiment of the invention, is rigidly fastened to the engine mounting bracket. The handle lever may, if desired, be jointed as shown in Figure 4, and at its end it has a sliding handle grip 65 to which the control wire 63 is anchored. A bolt 66 holds the joint rigidly in any given adjustment.

It will be observed that the grip arrangement is so nearly automatic as to relieve the operator of all consciousness of control. While the handle grip may be locked to the handle lever by engaging pin 70 in the offset portion of slot 71 (Fig. 4), it is ordinarily freely movable on the handle lever responsive to the operator's position. If the operator advances, the pressure of his hand on handle grip 65 will move the handle grip forwardly along the handle lever, thereby causing wire 63 to operate the control lever 60 to engage clutch parts 51 and 52 to set the driving wheels in motion in a forward direction. If the operator stops or slows his speed, the frame will tend to progress more rapidly than the handle grip 65, thereby retracting the handle grip with respect to the handle lever and disengaging the clutch parts to relieve the wheels 20 and 21 of their traction while maintaining the reel in full speed operation. Thus, without any conscious effort on the part of the operator, the machine is made to accommodate itself to his rate of movement and, even without the governor with which the engine is provided, the mower would advance just as fast as the operator, and no faster.

Where a large amount of backward movement, as well as forward movement, is required, the device may be made to include a simple reverse and differential gear mechanism such as is illustrated in Fig. 6, in which the engine is shown diagrammatically. In this construction the mower is somewhat wider in proportion to the length of the wheel. It is one of the advantages of the construction shown in Figs. 1, 2, and 3 that the reel is full width.

The engine drive shaft 33a may, in the Fig. 6 construction, transmit motion through bevel gearing 73 to pinion shaft 74 and pinion 75. With the pinion mesh the two gears 76 and 77 for rotation in opposite directions. The reel 50 is mounted on the hub of gear 77 to turn constantly in the proper direction with respect to the shear blade 17. The pinions 25 which drive the wheels 20 and 21 are mounted at the ends of live axles 53' and 53" respectively. At their adjacent ends these live axles carry gears 79 and 79' of a differential gear set held in assembly by the two parts of a spider 80 which carries the intermediate gears 81 and 82 of the differential. The arrangement is such that the spider 80 and live axles 53' and 53" are movable axially as a unit under the control of a shifting fork 83 connected by link 84 and bell crank 85 with the Bowden wire control member 63 which leads upwardly along handle lever 64 as previously described.

The spider 80 has two annular conically tapered clutch faces at its outer periphery, as clearly shown in Fig. 6, and these are engageable alternatively with the clutch linings 87 and 88 within the reversely driven gears 76 and 77. Where this construction is used the handle grip 65 is made to be movable in either direction from an intermediate position defined by the leg of a T-shaped slot 71' as shown at Fig. 5. When the pin 70 is centered in the main run or slot 71', the handle grip is freely moved under the control of the operator, so that the machine will not only advance when he advances and stop when he stops, but will reverse itself if he moves rearwardly.

It has already been pointed out that the connection of the handle grip with the clutch controlling the driving wheels is such that the mower will start or stop with the operator quite independently of any conscious effort on his part. Yet the reel will continue in operation so that on the backward pull of the mower, when the operator is working to a line, the grass will be severed the same as if the mower were moving forwardly. If, however, the operator of the embodiment shown in Figures 1 to 3 releases the handle its weight will cause the mower to tilt in a rearward direction to rest upon the foot 44, thereby immediately stopping the operation of the reel. The clutch controlled by this foot and shown particularly in Fig. 3, is preferably rather loosely set so that it serves as a slip clutch and permits the reel to stop if a stone or stick becomes wedged between the reel and the shear blade. The operator, however, cannot release such a stone without also releasing the handle grip and when he does this, the gravity induced movement of the machine itself on to foot 44 fully disengages the clutch in question so that the operator is safeguarded from accidental injury in the removal of the obstruction.

In order to illustrate possible applications of the invention to other types of handles and other types of self-propelled implements, I have disclosed some suggestions for vacuum sweeper and cultivator practice in Figures 7, 8, and 9.

In the vacuum sweeper diagrammatically illustrated in Figure 7, the motor 100, fan casing 101, and intake nozzle 102 have a generally conventional arrangement. The motor shaft is, however, extended rearwardly at 103 and arranged to drive, through the reduction gearing illustrated at 104 and the reversing clutch diagrammatically illustrated at 105, a flexible shaft 106, which operates the wheel 107 for the propulsion of the vacuum sweeper over the floor. The clutch 108 of the reverse gearing 105 is operated by means of the armature 109 of a pair of electromagnets 110 and 111. The handle grip 112 axially movable upon the end of the handle lever 113, carries contactors 114 and 115 so arranged with respect to the fixed contacts 116, 117, and 118 on the handle lever as to close a circuit alternatively to the one or the other of the magnets 110 or 111.

The operation is exactly similar to that of the lawn mower except that the control is entirely electrical. If the operator is moving forward, the independent motion of the handle grip 112 with respect to the sweeper will adjust the contactors 114 and 115 into an engagement with fixed contacts 116 and 117, respectively, thereby energizing the magnet 111 and engaging the clutch 108 with the gear which propels the wheel 107 in a forward direction. If the speed of the operator does not equal that of the machine, the machine will draw ahead of the handle grip 112 and the relative movement will disengage the moving contactors from the aforesaid contacts to open the circuit to the magnet 111 which will thereupon become deenergized. If there is any further relative movement between the handle grip 112 and the handle lever 113 in a rearward direction, the other magnet 110 will be energized, thereby engaging the clutch 108 with the other gear in order to propel the apparatus in a rearward direction.

Fig. 8 shows a more or less conventional type of cultivator in which the engine diagrammatically illustrated at 120 drives through a clutch 121, similar to that shown in Figure 3, the chain 122, sprocket 123, and the supporting and propelling wheels 124. In this arrangement the entire handle including its lever and grip portions 125 is movable upon links 127 with respect to the cultivator through a range which includes the dotted line positions of the parts. It is connected by means of link 126 with the operating arm of the clutch device 121, so that any forward movement of the handle grip with respect to the cultivator to the full line position shown in Fig. 8 will assure the drive of wheels 124, while any retarding of handle grip 125 with respect to the cultivator to the dotted line position shown in Fig. 8 will disengage the clutch 121 and allow the cultivator to stop. The links 127 which connect the handle 125 with the cultivator support the whole handle lever and grip for parallel motion so that it always preserves substantially the same angle with respect to the cultivator and the ground, thereby enabling the operator to control the tilting angle of the cultivator by means of the handle lever and grip in the usual way.

In Fig. 9 a different type of cultivator is used in which the drive to the wheel 124 is essentially the same but a supplemental wheel is provided at 129. The handle 130 instead of being supported by parallel links has its lever and grip portions pivoted at 131 to the frame of the cultivator and has an elbowed portion 132 connected by rod 133 with the operating arm of the clutch 121. This arrangement is quite distinct from that previously shown. The handle rises sufficiently above the fulcrum so that the forward push of the operator thereon rocks the handle around the fulcrum with much the same effect as the other controls herein illustrated.

But in addition, the whole handle 130 may be allowed to drop by gravity to the position indicated in dotted lines, the arrangement being such that if the operator for any reason deserts the apparatus, the clutch will necessarily be disengaged. Notwithstanding this additional feature, the handle connection shown in Fig. 9, may be made to operate the clutch simply by relative movement between the operator and the apparatus if the clutch is made sufficiently sensitive. At best, however, its operation will not be as delicate as that of the other devices illustrated.

The applications of the invention as herein disclosed are to be regarded as purely illustrative, and the invention is claimed generically. The mass of the engine and its associated parts in the structure shown in Figs. 1, 2, 6 and 8 is maintained in substantial balance above the wheels by using the whole handle as a lever to resist forces tending to oscillate the engine from the desired position. Where I have this function of the handle, and its further function of guiding the apparatus, in mind, I have referred to portion 64 of the handle shown in Figs. 1, 2 and 6 as a lever. It will, however, be understood that I do not wish, in the generic aspect of this invention, to differentiate between the lever portion of the handle and the grip portion thereof, as in some embodiments of the invention the lever portion as well as the grip portion is yieldable with respect to the tool and might be grasped by the operator at any point to position, to guide, and to start and stop the apparatus. In the appended claims, therefore, I have used the word "handle" generically to indicate any portion of the apparatus which, when grasped by the operator, will be so connected and movable as to perform the specified function. It is also to be understood that where I have referred to the grip portion I refer, unless otherwise indicated, generically to any part of the handle structure which, when grasped, will be operative to perform the specified functions whether or not the part of the handle structure grasped by the operator is specifically formed to serve as a grip.

I claim:

1. An implement comprising a frame and a pair of wheels connected to said frame and upon which said frame is pivotally mounted for free tilting movement to and from operative position and for movement over a supporting surface, a prime mover mounted on said frame, a working part operated thereby, a clutch controlling the operation of said part, a handle connected with said frame and upon which said frame is dependent for its position of tilting movement aforesaid, and a clutch actuating foot yieldably mounted on said frame in a position to engage the supporting surface when said frame is tilted from operative position in a direction to impose its weight on said foot, said foot having motion transmitting connections to said clutch for the disengagement thereof when said foot yields with respect to said frame upon the tilting of the frame and the consequent engagement of said foot with said surface.

2. An implement comprising the combination with a frame having spaced wheels upon which said frame may be propelled from point to point on a supporting surface and upon which said frame is freely tiltable to and from operative position, a prime mover mounted on said frame and provided with motion transmitting connections for the actuation of said wheels, a clutch controlling the operation of said wheels, a foot yieldably connected with said frame and positioned to engage said surface when said frame is tilted from operative position in a direction to impose its weight on said foot, actuating means operatively connected with said foot and said clutch to transmit the yielding movement of said foot for the disengagement of said clutch when said foot contacts said surface, and an actuating handle connected with said frame and upon which said frame is dependent for control of its aforesaid tilting movement and for the guidance of its movement on said surface.

3. A self-propelled implement comprising the combination with a wheeled frame and a handle having a grip portion movable with respect to the frame in a direction parallel to the path of movement of said frame, a prime mover on said frame provided with driving connections to the wheels, a clutch controlling the operation of said connections to all wheels affected thereby, and means connected with said grip portion for engaging said clutch in the forward movement of said grip portion and disengaging said clutch in the rearward movement thereof with respect to said frame.

4. A self-propelled implement comprising the combination with a wheeled frame and a prime mover thereon, of a handle including a grip portion, means connecting said handle grip portion with said frame including mechanism for accommodating forward and rearward motion of the handle grip portion with respect to the frame, connections for the transmission of motion from the prime mover to all wheels of the frame, means for rendering all said connections concurrently effective and ineffective for the transmission of motion, and means controlled by motion of said handle grip portion in a forward direction with respect to said frame for rendering said connections effective for the driving of said frame.

5. A self-propelled implement comprising the combination with a wheeled frame and a prime mover thereon, of a handle grip portion, means connecting said grip portion with the frame for movement having a component of direction longitudinally with respect to the direction of frame travel, said means being adapted to permit the use of said grip portion in the guidance of said frame, connections for the transmission of motion from the prime mover to the wheels of said frame, means for rendering said connections effective and ineffective for the transmission of motion, and means controlled by a rearward movement of the handle grip portion with respect to said frame for rendering all said connections ineffective for the propulsion of said frame.

6. A self-propelled implement comprising a wheeled frame, a prime mover thereon, means having forward and reverse driving controls for the transmission of motion from said prime mover to the wheels of said frame selectively in both directions, a handle portion connected with said frame for the guidance thereof and having a mounting with means for accommodating the handle movement both forwardly and rearwardly with respect thereto, means effective in the forward movement of said handle portion respecting said frame to operate the forward control of said driving connections, and means effective in the rearward movement of said handle portion respecting said frame for operating the reverse driving control.

7. A self-propelled vehicle comprising the combination with a vehicle frame having two wheels and a handle portion connected with said frame for control of its direction of movement and its position upon said wheels, said handle having means mounting it for movement with respect to said frame in a direction having a component parallel to the direction of vehicle motion, a prime mover on said vehicle concurrently operating both wheels thereof, propelling means for said vehicle, driving connections from said prime mover to said propelling means and including a single clutch for control of both wheels and a clutch actuating device controlled by relative movement between said handle portion and vehicle.

8. A self-propelled vehicle having a driving wheel, a handle comprising a lever aligned with the direction of movement of the vehicle and adapted to be grasped by one hand of the operator as a means of guiding and balancing the vehicle, said handle being connected with said vehicle for relative movement with respect thereto in a direction having a component parallel to the direction of movement of said vehicle and to the length of said handle, means for driving said wheel, a single control mechanism for said driving means, and a connection between said handle and said control mechanism for the actuation of said mechanism upon the occurrence of relative movement between said handle and said vehicle.

9. The combination with a self-propelled vehicle having a wheel and driving means therefor, of a handle lever connected with said vehicle for the guidance thereof, a handle grip longitudinally movable upon said lever in a generally forward and rearward direction respecting said vehicle, said grip being the portion of the handle normally grasped by the operator in guiding the vehicle, means connected with said handle grip to be actuated by the relative movement thereof and a clutch interposed between said driving means and said wheel for regulating the application of power to said wheel, said handle grip actuated means being provided with an operative connection to said clutch for motion transmission thereto in a direction to engage said clutch upon the relative forward movement of said grip respecting the vehicle, and to disengage said clutch upon the relative rearward movement of said grip respecting the vehicle.

10. An implement comprising a vehicle, a prime mover, a driving wheel, and driving connections including a clutch, in combination with a guiding handle connected with said vehicle, and means effective upon the release of the handle for disengaging the clutch, said means comprising a foot normally carried clear of the ground in the normal use of the handle and engageable with the ground upon release of the handle.

11. An implement comprising a vehicle, a prime mover, a driving wheel, and driving connections including a clutch, in combination with a guiding handle connected with said vehicle, and means effective upon the release of the handle for disengaging the clutch, said means comprising a foot normally carried clear of the ground in the normal use of the handle and engageable with the ground upon release of the handle, said foot being pivoted for yielding movement and connected with said clutch for the disengagement thereof upon the occurrence of such movement.

12. An implement comprising a vehicle, a prime mover, a driving wheel, and driving connections including a clutch, in combination with a guiding handle connected with said vehicle, and means effective upon the release of the handle for disengaging the clutch, said means comprising a pivotal mounting for said handle upon which said handle is bodily yieldable in a downward direction upon release by the operator, said handle being connected with said clutch for the disengagement thereof upon such downward movement.

13. An implement comprising a vehicle provided with a driving wheel and a frame, a prime mover fixedly mounted on said frame, driving connections including a clutch for actuating said wheel from said prime mover, a link connected with said clutch for the engagement and disengagement thereof, a guiding handle connected with said frame for directing the course of movement of said vehicle, and means connected with said link and effective upon release of the handle for disengaging the clutch.

14. An implement comprising the combination with a vehicle, including a wheel, a frame balanced for tilting movement about the axis of the wheel, and a handle lever upon which said vehicle is dependent for guidance and for balance about said axis, said handle lever being aligned with the direction of vehicle movement for manipulation by a single hand of the operator; of means connecting the handle lever with the frame for guiding movement and control of tilting as aforesaid, said means including links pivotally connected with the handle and the frame upon which the handle is movable independently of the frame in the direction of advance thereof; a prime mover mounted on the frame; driving connections from the prime mover to the wheel including a clutch; and a clutch actuator connected with said handle to be operated for engagement and disengagement of the clutch in the forward and rearward movements of the handle upon its link connection with the frame.

15. An implement comprising a vehicle having a pair of wheels with substantially aligned axes, a frame mounted on said wheels and tiltable about their substantially common axis in both directions from a predetermined normally balanced position upon said axis, a prime mover mounted on said frame, a driving connection from said prime mover to said wheels including a clutch, and a handle lever connected with said frame for control of the directional and tilting movements thereof and having a terminal portion projecting rearwardly from the frame, a grip longitudinally slidable upon said terminal portion, and a connection from said grip to said clutch operable upon the movement of said grip with respect to the terminal portion of the handle for engaging the clutch in the forward movement of the grip respecting the handle and disengaging the clutch upon rearward relative movement of the grip.

16. An implement comprising a vehicle mounted for forward, rearward and directional movement, of a prime mover mounted on said vehicle, propelling means for said vehicle, driving connections between said prime mover and propelling means including a clutch, a handle lever projecting rearwardly from said vehicle, a handle grip aligned longitudinally with said lever and disposed adjacent the end thereof for manipulation by a single hand of the operator to control the directional movement of said vehicle, said grip being longitudinally slidable with respect to the lever, and motion transmitting connections from said grip to said clutch for transmitting the motion of said grip with respect to said handle for engaging and disengaging the clutch, whereby to control the movement of the vehicle.

17. A self propelled implement comprising the combination with a frame and a pair of supporting wheels upon which said frame is tiltable, of an operating mechanism carried by the frame, a prime mover mounted on the frame, connections for the driving of said operating mechanism including a clutch, connections for the simultaneous driving of said wheels from said prime mover including a second clutch, a lever projecting rearwardly from the frame upon which the frame is dependent for guidance and its position of tilting adjustment upon said wheels, a shoe provided with means supporting it for yielding movement with respect to said frame and for engagement with the ground upon the tilting of the frame from its normal operating position, a connection from the shoe to the first mentioned clutch for the disengagement of said clutch upon the yielding of said shoe with respect to said frame consequent upon engagement of the shoe with the ground, a handle on the lever adapted to be held by the operator in controlling the implement, said handle having means providing for its movement with respect to the frame, and a connection from said handle to said second clutch for the engagement of said clutch upon the forward movement of said handle with respect to the frame and the disengagement of said clutch upon the rearward movement of the handle with respect to the frame.

18. In a lawn mower, the combination with a wheeled frame and a handle connected therewith, of a foot yieldably mounted to engage the earth when the handle is released, mowing means mounted on said frame, a prime mover mounted on said frame and provided with a clutch controlled connection to said mowing means, and mechanism for transmitting the yielding movement of said foot to said clutch for the disengagement thereof when said foot contacts the earth, whereby said clutch is automatically disengaged upon the release of said handle.

19. A lawn mower comprising the combination with a wheeled frame provided with a handle and tiltable upon the release of said handle, cutting means operatively mounted on said frame, a prime mover mounted on said frame and provided with a clutch, connections from said clutch to said actuating means and to the wheels of said frame for the power operation of said cutting means and wheels, a second clutch independently controlling the operation of said wheels, a yieldable foot engageable with the earth upon the tilting of the frame, and means connecting said foot operatively with said first mentioned clutch, whereby to interrupt motion transmission both to said cutting means and wheels upon the tilting of said frame, said frame having a handle normally controlling its position.

20. A lawn mower comprising the combination with a single pair of wheels, a frame tiltably mounted thereon, cutting means located between said wheels and at least as far forward as the approximate location of the axes of said wheels, a handle connected with said frame and upon which said frame is dependent for the control of its position of tilting movement upon said wheels, a prime mover mounted on said frame in substantially balanced position above the axes of said wheels, a clutch controlled connection from said prime mover to said cutting means and wheels, a yieldable foot engageable with the earth upon the appearance of an abnormal tilting movement of said frame, and a clutch disengaging connection for the transmission of the yielding motion of said foot to said clutch, whereby to interrupt motion transmission from said prime mover when said frame is abnormally tilted.

21. In a lawn mower, the combination with a frame provided with propelling wheels, of propelling means operatively connected with said wheels and provided with a clutch, a mower mounted on said frame and including a mower shaft having an operative connection through said clutch with said wheel propelling means, a prime mover mounted on said frame, motion transmitting connections from said prime mover to said mower shaft including a second clutch, a handle for said frame, means dependent upon the operator's continued manipulation of said handle for maintaining said second clutch in engagement and for releasing it upon the operator's release of said handle, and clutching means under the operator's control for independently releasing and engaging said first mentioned clutch.

22. In a power lawn mower, the combination with a frame having wheels and clutch controlled means for propelling the wheels, of clutch actuating mechanism comprising a handle longitudinally movable forwardly and rearwardly with respect to the mower, and connections between the handle and the clutch actuating mechanism for engaging said clutch upon the forward movement of said handle with respect to the mower and for disengaging said clutch upon the rearward movement of said handle respecting said mower.

23. A power lawn mower comprising the combination with a frame provided with wheels, a prime mover and a mower, of means for primarily driving said mower from said prime mover, clutch controlled means for driving said wheels from said mower, the clutch of said means being operable independently of the means primarily driving said mower, a handle connected with said frame and movable forwardly and rearwardly with respect thereto, and motion transmitting connections controlled by relative movement between said handle and frame and leading to said clutch for engagement of said clutch in the forward relative movement of said handle, and disengaging said clutch in the rearward relative movement thereof, said mower continuing in operation irrespective of the engagement and disengagement of said clutch.

24. In a power lawn mower, the combination with a frame provided with substantially aligned supporting wheels upon which said frame may be guided for movement over a supporting surface and may be tilted freely to and from operative position, a mower, a mower shaft mounted on said frame, a prime mover mounted on said frame and provided with a clutch controlled connection to said mower shaft, clutch controlled means for driving said wheels from said mower shaft, a handle connected to said frame for the guidance thereof and having a portion movable forwardly and rearwardly with respect to the frame, means for transmitting the relative forward and rearward movement of said handle to said clutch controlled means for propelling the wheels of said frame, whereby to propel said wheels when said handle is forward with respect to said frame and to interrupt the propulsion of said wheels when said handle is moved rearwardly with respect to said frame, a yieldable foot engageable with the supporting surface when said frame is tilted abnormally from its operative position, and means controlled by movement of said foot respecting said frame to disengage said first mentioned clutch, whereby to interrupt the transmission of motion to said mower shaft and also to said wheels.

FINN T. IRGENS.